United States Patent
Shin et al.

(10) Patent No.: US 10,696,796 B2
(45) Date of Patent: Jun. 30, 2020

(54) POLYSILOXANE-POLYCARBONATE COPOLYMER WITH IMPROVED TRANSPARENCY AND FLAME RETARDANCY AND METHOD FOR PRODUCING SAME

(71) Applicants: SAMYANG CORPORATION, Seoul (KR); DAMIPOLYCHEM CO., LTD., Iksan-si, Jeollabuk-do (KR)

(72) Inventors: Kyung Moo Shin, Daejeon (KR); Young Do Kwon, Daejeon (KR)

(73) Assignees: SAMYANG CORPORATION, Seoul (KR); DAMIPOLYCHEM CO., LTD., Iksan-si (KR)

( * ) Notice: Subject to any disclaimer, the term of this patent is extended or adjusted under 35 U.S.C. 154(b) by 88 days.

(21) Appl. No.: 15/768,099

(22) PCT Filed: Oct. 14, 2016

(86) PCT No.: PCT/KR2016/011543
§ 371 (c)(1),
(2) Date: Apr. 13, 2018

(87) PCT Pub. No.: WO2017/065550
PCT Pub. Date: Apr. 20, 2017

(65) Prior Publication Data
US 2018/0305499 A1    Oct. 25, 2018

(30) Foreign Application Priority Data

Mar. 4, 2016   (KR) .................. 10-2016-0026561

(51) Int. Cl.
| | | |
|---|---|---|
| C08G 77/448 | (2006.01) | |
| C08G 64/18 | (2006.01) | |
| C08G 77/14 | (2006.01) | |
| C08G 77/04 | (2006.01) | |
| C08G 77/06 | (2006.01) | |
| C08G 77/00 | (2006.01) | |

(52) U.S. Cl.
CPC ......... C08G 77/448 (2013.01); C08G 64/186 (2013.01); C08G 77/04 (2013.01); C08G 77/06 (2013.01); C08G 77/14 (2013.01); C08G 77/80 (2013.01)

(58) Field of Classification Search
CPC .................................................. C08G 77/448
See application file for complete search history.

(56) References Cited

U.S. PATENT DOCUMENTS

| | | | |
|---|---|---|---|
| 2,999,835 A | 9/1961 | Goldberg et al. | |
| 3,028,365 A | 4/1962 | Schnell et al. | |
| 3,153,008 A | 10/1964 | Fox et al. | |
| 3,334,154 A | 8/1967 | Kim et al. | |
| 5,916,980 A * | 6/1999 | Ogawa | C08G 64/186 525/464 |
| 2003/0105226 A1 | 6/2003 | Cella et al. | |
| 2010/0267879 A1* | 10/2010 | Isozaki | C08L 69/00 524/420 |

FOREIGN PATENT DOCUMENTS

| | | |
|---|---|---|
| KR | 10-2013-0047332 A | 5/2013 |
| KR | 10-2013-0116666 A | 10/2013 |
| KR | 10-2015-0003683 A | 1/2015 |
| KR | 10-2015-0012508 A | 2/2015 |
| KR | 10-1675197 B1 | 11/2016 |
| WO | WO 2013/066000 A1 | 5/2013 |

OTHER PUBLICATIONS

Mollah et al., "Synthesis and characterization of polycarbonates containing terminal and chain interior siloxane", Polym. Bull. 2012, vol. 68, pp. 1551-1564.
Written Opinion (PCT/ISA/237) issued in PCT/KR2016/011543, dated Jan. 19, 2017.

* cited by examiner

*Primary Examiner* — Mark S Kaucher
(74) *Attorney, Agent, or Firm* — Birch, Stewart, Kolasch & Birch, LLP

(57) ABSTRACT

The present invention relates to a polysiloxane-polycarbonate copolymer having improved transparency and flame retardancy, and a method for producing the same. More specifically, the present invention relates to a polysiloxane having a specific structure having a side chain containing a randomly substituted hydroxyphenyl group, a polysiloxane-polycarbonate copolymer having the polysiloxane and a polycarbonate block as repeating units, exhibiting excellent flame retardancy and also excellent transparency, and a method for producing the same.

12 Claims, No Drawings

POLYSILOXANE-POLYCARBONATE COPOLYMER WITH IMPROVED TRANSPARENCY AND FLAME RETARDANCY AND METHOD FOR PRODUCING SAME

TECHNICAL FIELD

The present invention relates to a polysiloxane-polycarbonate copolymer with improved transparency and flame retardancy, and a method for preparing the same. More specifically, the present invention relates to a polysiloxane of a specific structure having side chain comprising optionally substituted hydroxyphenyl group; and a polysiloxane-polycarbonate copolymer, which comprises the polysiloxane and a polycarbonate block as repeating units and thus has good flame retardancy and shows excellent transparency at the same time, and a method for preparing the same.

BACKGROUND ART

Polycarbonate resin has good heat resistance, mechanical properties (in particular, impact strength) and transparency. Thus, it has been extensively used as electrical components, mechanical components and industrial resin. In the electric/electronic fields, in particular, when polycarbonate resin is used for TV housing, computer monitor housing, copier, printer, notebook battery, lithium battery case material, etc., releasing considerable heat, good flame retardancy is required as well as heat resistance and mechanical properties.

The conventional way to impart flame retardancy to a polycarbonate resin is to mix polycarbonate resin and halogenated flame retardant including brominated or chlorinated compound. Halogenated flame retardants exhibit sufficient flame-retarding performance in case of fire, but hydrogen halide gas is generated during resin processing, which can, not only cause cast erosion and environmental issues but also produce dioxin which is toxic and harmful to humans when it burns. Accordingly, a move to regulate use thereof has been extended. In order to cope with such regulation, flame-retardant polycarbonate resin compositions comprising both alkali metal salt as a non-halogenated flame retardant and fluorinated polyolefin resin as an anti-dripping agent have been developed. However, use of fluorinated ethylene-based resin and metal salt flame retardant to ensure flame retardancy of polycarbonate resin leads to degraded transparency which is one of the advantages of polycarbonate resin.

In order to overcome such degradation of transparency, alloying with silicone-based additives and silicone-based copolymer has been proposed. However, despite the environmental advantages of non-halogenated flame retardant, the technique using silicone-based additives has disadvantages such as poor optical transparency, relatively high price and limitation on coloring when used as an exterior material. In addition, poor flowability makes it difficult to apply to produce a large article by injection molding.

Accordingly, development of a polycarbonate resin composition which shows sufficient flame retardancy and can realize harmonized properties of good transparency, flowability, low-temperature impact strength, etc. is still required.

PATENT PUBLICATIONS

US patent publication No. 2003/0105226 A1

CONTENTS OF THE INVENTION

Problems to be Solved

The present invention is intended to resolve the above-stated problems of the prior arts, and has an object of providing a flame-retardant polysiloxane-polycarbonate copolymer with good flame retardancy and transparency, and a method for preparing the same.

Technical Means

The present invention provides a polysiloxane of the following chemical formula 1:

[Chemical formula 1]

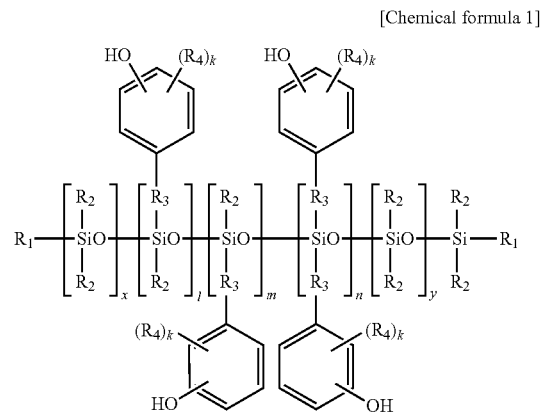

In the above chemical formula 1, $R_1$ independently represents hydrogen atom, hydrocarbon group having 1 to 13 carbon atoms, or hydroxy group;

$R_2$ independently represents hydrocarbon group having 1 to 13 carbon atoms, or hydroxy group;

$R_3$ independently represents alkylene group having 2 to 8 carbon atoms;

$R_4$ independently represents hydrogen atom, halogen atom, hydroxy group, alkyl group having 1 to 20 carbon atoms, alkoxy group having 1 to 20 carbon atoms, or aryl group having 6 to 10 carbon atoms;

k independently represents an integer of 1 to 4;

each of l, m and n independently represents an integer of 0 to 4, provided that at least one of l, m and n is not 0; and each of x and y independently represents an integer of 0 to 100.

In another aspect, the present invention provides a polysiloxane-polycarbonate copolymer comprising, as repeating units, a polysiloxane of the above chemical formula 1 and a polycarbonate block of the following chemical formula 2:

[Chemical formula 2]

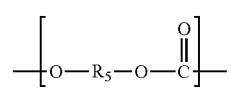

In the above chemical formula 2, $R_5$ represents aromatic hydrocarbon group having 6 to 30 carbon atoms which is unsubstituted or substituted with alkyl group, cycloalkyl group, alkenyl group, alkoxy group, halogen atom, or nitro.

Also, in another aspect, the present invention provides a method for preparing a polysiloxane-polycarbonate copolymer, comprising the steps of: reacting a polysiloxane of the above chemical formula 1 and an oligomeric polycarbonate under an interfacial reaction condition to form a polysiloxane-polycarbonate intermediate; and polymerizing the intermediate by using a first polymerization catalyst.

In still another aspect, the present invention provides a molded article produced by using the polysiloxane-polycarbonate copolymer.

Effect of the Invention

The polysiloxane-polycarbonate copolymer according to the present invention can secure good flame retardancy even without addition of flame-retarding agent while soundly maintaining good inherent properties of polycarbonate such as impact resistance and transparency, and thus it can be applied in various uses such as construction materials, automotive parts and electric/electronic parts.

CONCRETE MODE FOR CARRYING OUT THE INVENTION

The present invention is explained in more detail below.

The term "reaction product" as used herein means a substance that is formed by reacting two or more reactants.

In addition, although the terms "first," "second" and the like are used herein for the description of polymerization catalysts, the polymerization catalysts are not limited by these terms. These terms are just used to distinguish the polymerization catalysts from each other. For example, a first polymerization catalyst and a second polymerization catalyst may be of the same kind of catalyst or different kinds of catalyst.

Furthermore, in the chemical formulas described herein, although the English character "R" used for representing hydrogen, halogen atom and/or hydrocarbon group, etc. has a numerical subscript, "R" is not limited by such a subscript. "R" represents, independently from each other, hydrogen, halogen atom and/or hydrocarbon group, etc. For example, regardless of whether two or more "R"s have the same numerical subscript or different numerical subscripts, such "R"s may represent the same hydrocarbon group or different hydrocarbon groups.

Polysiloxane

The polysiloxane according to the present invention, which is a compound wherein siloxanes including a siloxane having hydroxyphenyl group in its side chain are connected, is represented by the following chemical formula 1:

[Chemical formula 1]

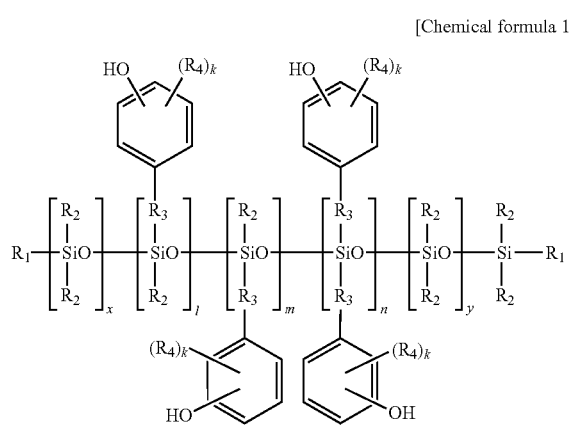

In the above chemical formula 1, $R_1$ independently represents hydrogen atom, hydrocarbon group having 1 to 13 carbon atoms, or hydroxy group;

$R_2$ independently represents hydrocarbon group having 1 to 13 carbon atoms, or hydroxy group;

$R_3$ independently represents alkylene group having 2 to 8 carbon atoms;

$R_4$ independently represents hydrogen atom, halogen atom, hydroxy group, alkyl group having 1 to 20 carbon atoms, alkoxy group having 1 to 20 carbon atoms, or aryl group having 6 to 10 carbon atoms;

k independently represents an integer of 1 to 4;

each of l, m and n independently represents an integer of 0 to 4, preferably 0 to 2, provided that at least one of l, m and n is not 0; and each of x and y independently represents an integer of 0 to 100, preferably 0 to 50, more preferably 0 to 10, or each of x and y independently may represent an integer of 2 to 100, preferably 2 to 50, more preferably 2 to 10.

More concretely, the hydrocarbon group having 1 to 13 carbon atoms may be alkyl group or alkoxy group having 1 to 13 carbon atoms, alkenyl group or alkenyloxy group having 2 to 13 carbon atoms, cycloalkyl group or cycloalkoxy group having 3 to 6 carbon atoms, aryloxy group having 6 to 10 carbon atoms, aralkyl group or aralkoxy group having 7 to 13 carbon atoms, or alkaryl group or alkaryloxy group having 7 to 13 carbon atoms.

For example, the alkyl group may be methyl, ethyl or propyl; the alkylene group may be ethylene or propylene; the halogen atom may be Cl or Br; the alkoxy group may be methoxy, ethoxy or propoxy; and the aryl group may be phenyl, chlorophenyl or tolyl (preferably, phenyl).

In a preferable embodiment, the polysiloxane of the above chemical formula 1 may be a reaction product of a polysiloxane of the following chemical formula 3 and a compound of the following chemical formula 4:

[Chemical formula 3]

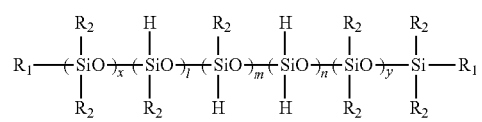

In the above chemical formula 3, $R_1$, $R_2$, l, m, n, x and y are the same as defined in the above chemical formula 1.

[Chemical formula 4]

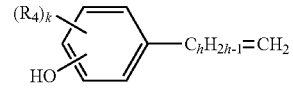

In the above chemical formula 4, $R_4$ and k are the same as defined in the above chemical formula 1; and h represents an integer of 1 to 7.

For use in preparing a polysiloxane of chemical formula 1, it is preferable to maintain the molar ratio of a compound of chemical formula 3 to a compound of chemical formula 4 in a range of 1:4 to 1:1, and more preferably 1:3 to 1:2. If the molar ratio of a compound of chemical formula 3 to a compound of chemical formula 4 is out of the above range, it affects the polymerization degree of the polysiloxane and polycarbonate, and thus may be a factor of deterioration of the flame retardancy and transparency.

Polysiloxane-Polycarbonate Copolymer

The polysiloxane-polycarbonate copolymer according to the present invention is a copolymer comprising, as repeating units, a polysiloxane of the above chemical formula 1 (that is, a polysiloxane block having hydroxyphenyl group in its side chain) and a polycarbonate block of the following chemical formula 2:

[Chemical formula 2]

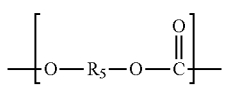

In the above chemical formula 2, $R_5$ represents aromatic hydrocarbon group having 6 to 30 carbon atoms which is unsubstituted or substituted with alkyl group (e.g., alkyl group having 1 to 20 carbon atoms, or 1 to 13 carbon atoms), cycloalkyl group (e.g., cycloalkyl group having 3 to 6 carbon atoms), alkenyl group (e.g., alkenyl group having 2 to 20 carbon atoms, or 2 to 13 carbon atoms), alkoxy group (e.g., alkoxy group having 1 to 20 carbon atoms, or 1 to 13 carbon atoms), halogen atom (e.g., Cl or Br), or nitro. In the above, for example, the aromatic hydrocarbon group may be derived from a compound of the following chemical formula 5:

[Chemical formula 5]

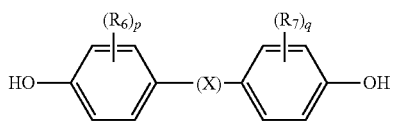

In the above chemical formula 5,

X represents alkylene group; linear, branched or cyclic alkylene group having no functional group; or linear, branched or cyclic alkylene group comprising at least one functional group selected from the group consisting of sulfide, ether, sulfoxide, sulfone, ketone, naphthyl, or isobutylphenyl (e.g., linear or branched alkylene group having 1 to 10 carbon atoms, or cyclic alkylene group having 3 to 10 carbon atoms), each of $R_6$ and $R_7$ independently represents halogen atom (e.g., Cl or Br), or linear, branched or cyclic alkyl group (e.g., linear or branched alkyl group having 1 to 10 carbon atoms, or cyclic alkyl group having 3 to 10 carbon atoms), and p and q independently represent an integer of 0 to 4.

The compound of the above chemical formula 5 may be, for example, bis(4-hydroxyphenyl)methane, bis(4-hydroxyphenyl)phenylmethane, bis(4-hydroxyphenyl)naphthylethane, bis(4-hydroxyphenyl)-(4-isobutylphenyl)methane, 1,1-bis(4-hydroxyphenyl)ethane, 1-ethyl-1,1-bis(4-hydroxyphenyl)propane, 1-phenyl-1,1-bis(4-hydroxyphenyl)ethane, 1-naphthyl-1,1-bis(4-hydroxyphenyl)ethane, 1,2-bis(4-hydroxyphenyl)ethane, 1,10-bis(4-hydroxyphenyl)decane, 2-methyl-1,1-bis(4-hydroxyphenyl)propane, 2,2-bis(4-hydroxyphenyl)propane, 2,2-bis(4-hydroxyphenyl)butane, 2,2-bis(4-hydroxyphenyl)pentane, 2,2-bis(4-hydroxyphenyl)hexane, 2,2-bis(4-hydroxyphenyl)nonane, 2,2-bis(3-methyl-4-hydroxyphenyl)propane, 2,2-bis(3-fluoro-4-hydroxyphenyl)propane, 4-methyl-2,2-bis(4-hydroxyphenyl)pentane, 4,4-bis(4-hydroxyphenyl)heptane, diphenyl-bis(4-hydroxyphenyl)methane, resorcinol, hydroquinone, 4,4'-dihydroxyphenyl ether[bis(4-hydroxyphenyl) ether], 4,4'-dihydroxy-2,5-dihydroxydiphenyl ether, 4,4'-dihydroxy-3,3'-dichlorodiphenyl ether, bis(3,5-dimethyl-4-hydroxyphenyl)ether, bis(3,5-dichloro-4-hydroxyphenyl) ether, 1,4-dihydroxy-2,5-dichlorobenzene, 1,4-dihydroxy-3-methylbenzene, 4,4'-dihydroxydiphenol[p,p'-dihydroxyphenyl], 3,3'-dichloro-4,4'-dihydroxyphenyl, 1,1-bis(4-hydroxyphenyl)cyclohexane, 1,1-bis(3,5-dimethyl-4-hydroxyphenyl)cyclohexane, 1,1-bis(3,5-dichloro-4-hydroxyphenyl)cyclohexane, 1,1-bis(3,5-dimethyl-4-hydroxyphenyl)cyclododecane, 1,1-bis(4-hydroxyphenyl) cyclododecane, 1,1-bis(4-hydroxyphenyl)butane, 1,1-bis(4-hydroxyphenyl)decane, 1,4-bis(4-hydroxyphenyl)propane, 1,4-bis(4-hydroxyphenyl)butane, 1,4-bis(4-hydroxyphenyl) isobutane, 2,2-bis(4-hydroxyphenyl)butane, 2,2-bis(3-chloro-4-hydroxyphenyl)propane, bis(3,5-dimethyl-4-hydroxyphenyl)methane, bis(3,5-dichloro-4-hydroxyphenyl) methane, 2,2-bis(3,5-dimethyl-4-hydroxyphenyl)propane, 2,2-bis(3,5-dibromo-4-hydroxyphenyl)propane, 2,2-bis(3,5-dichloro-4-hydroxyphenyl)propane, 2,4-bis(4-hydroxyphenyl)-2-methyl-butane, 4,4'-thiodiphenol[bis(4-hydroxyphenyl)sulfone], bis(3,5-dimethyl-4-hydroxyphenyl)sulfone, bis(3-chloro-4-hydroxyphenyl)sulfone, bis(4-hydroxyphenyl)sulfide, bis(4-hydroxyphenyl)sulfoxide, bis(3-methyl-4-hydroxyphenyl)sulfide, bis(3,5-dimethyl-4-hydroxyphenyl) sulfide, bis(3,5-dibromo-4-hydroxyphenyl)sulfoxide, 4,4'-dihydroxybenzophenone, 3,3',5,5'-tetramethyl-4,4'-dihydroxybenzophenone, 4,4'-dihydroxy diphenyl, methylhydroquinone, 1,5-dihydroxynaphthalene, or 2,6-dihydroxynaphthalene, but it is not limited thereto. Among them, the representative one is 2,2-bis(4-hydroxyphenyl) propane (bisphenol A). For other functional dihydric phenols, U.S. Pat. Nos. 2,999,835, 3,028,365, 3,153,008 and 3,334,154 may be referred to. The above dihydric phenol may be used alone or in combination of two or more of them.

In case of carbonate precursor, for example, carbonyl chloride (phosgene), carbonyl bromide, bis halo formate, diphenylcarbonate, dimethylcarbonate, etc. may be used as another monomer of the polycarbonate resin.

In a preferable embodiment, the amount of the polysiloxane of chemical formula 1 in the polysiloxane-polycarbonate copolymer of the present invention is 0.5 to 20% by weight, and more preferably 3 to 15% by weight, based on the total weight of the copolymer, and the amount of the polycarbonate is 80 to 99.5% by weight, and more preferably 85 to 97% by weight, based on the total weight of the copolymer. If the amount of the polysiloxane of chemical formula 1 in the copolymer is less than 0.5% by weight, the flame retardancy may deteriorate, and if its amount is greater than 20% by weight, the flame retardancy may be improved, but the transparency may deteriorate.

In a preferable embodiment, the polysiloxane-polycarbonate copolymer according to the present invention has a viscosity average molecular weight (Mv) of 15,000 to 200,000, and more preferably 15,000 to 100,000. If the viscosity average molecular weight of the polysiloxane-polycarbonate copolymer is less than 15,000, the mechanical properties may deteriorate seriously, and if its viscosity average molecular weight is greater than 200,000, there may be a problem in the processing of resin due to the increase of melting viscosity.

The polysiloxane-polycarbonate copolymer according to the present invention may be prepared through the steps of: reacting a polysiloxane of the above chemical formula 1 and an oligomeric polycarbonate under an interfacial reaction condition, which consists of aqueous alkaline solution and organic phase, to form a polysiloxane-polycarbonate intermediate; and polymerizing the intermediate by using a first polymerization catalyst.

In a preferable embodiment, the step of forming the intermediate may comprise a step of mixing a polysiloxane of chemical formula 1 and an oligomeric polycarbonate in a weight ratio of 0.5:99.5 to 20:80 (more preferably 3:97 to 15:85, and most preferably 3:97 to 10:90). If the mixing ratio of the polysiloxane of chemical formula 1 is less than 0.5, the flame retardancy may deteriorate, and if its mixing ratio is greater than 20, the flame retardancy may be improved, but the transparency may deteriorate.

The oligomeric polycarbonate used in the preparation of the polysiloxane-polycarbonate copolymer according to the present invention may be an oligomeric polycarbonate having a viscosity average molecular weight of 800 to 20,000 (more preferably 1,000 to 15,000). If the viscosity average molecular weight of the oligomeric polycarbonate is less than 800, the molecular weight distribution may broaden and physical properties may deteriorate, and if its viscosity average molecular weight is greater than 20,000, the reactivity may be lowered.

In an embodiment, the oligomeric polycarbonate may be prepared by adding the above-explained dihydric phenol compound in an aqueous alkaline solution to make it in a phenol salt state, and then adding the phenol compound in a phenol salt state to dichloromethane containing injected phosgene gas for reaction. To prepare the oligomer, it is preferable to maintain the molar ratio of phosgene to bisphenol within a range of about 1:1 to 1.5:1, and more preferably 1:1 to 1.2:1. If the molar ratio of phosgene to bisphenol is less than 1, the reactivity may be lowered, and if the molar ratio of phosgene to bisphenol is greater than 1.5, the molecular weight increases excessively and thus the processability may be problematic.

The above reaction of forming an oligomer may generally be conducted at a temperature range of about 15 to 60° C. In order to adjust the pH of the reaction mixture, alkali metal hydroxide (e.g., sodium hydroxide) may be used.

In an embodiment, the step of forming the intermediate comprises a step of forming a mixture comprising the polysiloxane and the oligomeric polycarbonate, wherein the mixture may further comprise a phase transfer catalyst, a molecular weight-controlling agent and a second polymerization catalyst. In addition, the step of forming the intermediate may comprise a step of forming a mixture comprising the polysiloxane and the oligomeric polycarbonate; and after completion of the reaction of the polysiloxane and the oligomeric polycarbonate, a step of extracting an organic phase from the resulting mixture, and the step of polymerizing the intermediate may comprise a step of providing the first polymerization catalyst to the extracted organic phase.

Concretely, the polysiloxane-polycarbonate copolymer according to the present invention may be prepared by adding the polysiloxane to a mixture of organic phase-aqueous phase containing the polycarbonate, and subsequently feeding a molecular weight-controlling agent and a catalyst.

As the molecular weight-controlling agent, a monofunctional compound similar to a monomer used in preparation of polycarbonate may be used. The monofunctional compound may be, for example, a derivative based on phenol such as p-isopropylphenol, p-tert-butylphenol (PTBP), p-cumylphenol, p-isooctylphenol and p-isononylphenol, or an aliphatic alcohol. Preferably, p-tert-butylphenol (PTBP) may be used.

As the catalyst, a polymerization catalyst and/or a phase transfer catalyst may be used. The polymerization catalyst may be, for example, triethylamine (TEA), and the phase transfer catalyst may be a compound of the following chemical formula 6:

  [Chemical formula 6]

In the above chemical formula 6, $R_8$ represents alkyl group having 1 to 10 carbon atoms; Q represents nitrogen or phosphorus; and X represents halogen atom or —$OR_9$, wherein $R_9$ represents hydrogen atom, alkyl group having 1 to 18 carbon atoms or aryl group having 6 to 18 carbon atoms.

Concretely, the phase transfer catalyst may be, for example, $[CH_3(CH_2)_3]_4NX$, $[CH_3(CH_2)_3]_4PX$, $[CH_3(CH_2)_5]_4NX$, $[CH_3 (CH_2)_6]_4NX$, $[CH_3(CH_2)_4]_4NX$, $CH_3[CH_3(CH_2)_3]_3NX$ or $CH_3[CH_3(CH_2)_2]_3NX$, wherein X represents Cl, Br or —$OR_9$ where $R_9$ represents hydrogen atom, alkyl group having 1 to 18 carbon atoms or aryl group having 6 to 18 carbon atoms.

The amount of the phase transfer catalyst is preferably about 0.01 to 10% by weight based on the total weight of the mixture of the polysiloxane of chemical formula 1 and the oligomeric polycarbonate. If the amount of the phase transfer catalyst is less than 0.01% by weight, the reactivity may be lowered, and if its amount is greater than 10% by weight, the phase transfer catalyst may be precipitated or the transparency may deteriorate.

In an embodiment, after the polysiloxane-polycarbonate copolymer is prepared, the organic phase dispersed in methylene chloride is washed with alkali and then separated. Subsequently, the organic phase is washed with 0.1 N solution of hydrochloric acid and then rinsed with distilled water 2 or 3 times. After rinsing is completed, the concentration of the organic phase dispersed in methylene chloride is adjusted constantly and granulation is conducted by using a constant amount of pure water at a temperature ranging from 70 to 80° C. If the temperature of the pure water is lower than 70° C., the granulation rate is low and thus the granulation time may be too long. If the temperature of the pure water is higher than 80° C., it may be difficult to obtain the polycarbonate in uniformly sized morphology. After granulation is completed, it is preferable to dry the product at 100 to 110° C. for 5 to 10 hours first, and then at 110 to 120° C. for 5 to 10 hours.

According to another aspect of the present invention, a molded article produced by using the polysiloxane-polycarbonate copolymer of the present invention can be provided. As the molding process, extrusion molding, injection molding, etc. may be used, but it is not limited thereto. The article provided according to the present invention can be applied in various uses such as construction materials, automotive parts and electric/electronic parts, etc., but it is not limited thereto.

There is no special limitation in a method for producing a molded article by using the polysiloxane-polycarbonate copolymer of the present invention, and a method generally used in resin article production may be employed as it is or with proper modification.

The present invention is explained in more detail through the following Examples. However, the scope of the present invention is not limited thereby in any manner.

EXAMPLES

Example 1

<Preparation of Polysiloxane>

In a 500 mL three-necked flask equipped with a condenser, under nitrogen atmosphere 50.44 g (0.1 mole) of a polysiloxane corresponding to the above chemical formula 3 (F5032, Dami Polychem, a colorless transparent liquid with a viscosity of 5 cP) was dissolved in 50 ml of toluene, and then 0.008 g (100 ppm) of platinum (Pt) catalyst (CP101, Dami Polychem) was added thereto. In a state of heating the resulting solution, 26.8 g (0.2 mole) of 2-allylphenol was slowly added thereto for 1 hour, and the resulting solution was refluxed for 5 hours. After the reaction was completed, the toluene solvent was removed from the solution, and the product was dried in a vacuum oven for 24 hours to prepare the polysiloxane of the following chemical formula 7:

[Chemical formula 7]

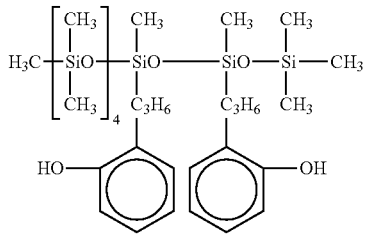

<Preparation of Polysiloxane-Polycarbonate Copolymer>

An interfacial reaction of bisphenol A in an aqueous solution and phosgene gas was conducted in the presence of methylene chloride to prepare an oligomeric polycarbonate mixture having a viscosity average molecular weight of about 1,000. An organic phase was extracted from the obtained oligomeric polycarbonate mixture, and thereto an aqueous solution of sodium hydroxide, the polysiloxane of the above chemical formula 7 (in amount of 2% by weight based on the total weight of the copolymer), tetrabutyl ammonium chloride (TBACl, in amount of 0.1% by weight based on the total weight of the copolymer), methylene chloride and p-tert-butylphenol (PTBP, in amount of 0.4% by weight based on the total weight of the copolymer) were admixed and reacted for 2 hours. After the phase separation, only the organic phase was collected, and thereto an aqueous solution of sodium hydroxide, methylene chloride and triethylamine (TEA, in amount of 0.015% by weight based on the total weight of the copolymer) were added and reacted for 3 hours. To the reacted organic phase, triethylamine (TEA, in amount of 0.02% by weight based on the total weight of the copolymer) was further added and reacted for additional 2 hours. After the phase separation, the organic phase with increased viscosity was collected, and thereto distilled water and methylene chloride were added, and the organic phase was washed with alkali and separated again. Next, the resulting organic phase was washed with 0.1N hydrochloric acid solution and then rinsed with distilled water 2 to 3 times. After the rinsing was completed, the organic phase was granulated by using a constant amount of pure water at 76° C. After the granulation was completed, the product was dried first at 110° C. for 8 hours and then at 120° C. for 10 hours. The properties of the prepared polysiloxane-polycarbonate copolymer were measured and are shown in the following Table 1.

Example 2

<Preparation of Polysiloxane>

In a 500 mL three-necked flask equipped with a condenser, under nitrogen atmosphere 49.04 g (0.1 mole) of a polysiloxane corresponding to the above chemical formula 3 (F5032, Dami Polychem, a colorless transparent liquid with a viscosity of 5 cP) was dissolved in 50 ml of toluene, and then 0.008 g (100 ppm) of platinum (Pt) catalyst (CP101, Dami Polychem) was added thereto. In a state of heating the resulting solution, 40.2 g (0.3 mole) of 2-allylphenol was slowly added thereto for 1 hour, and the resulting solution was refluxed for 5 hours. After the reaction was completed, the toluene solvent was removed from the solution, and the product was dried in a vacuum oven for 24 hours to prepare the polysiloxane of the following chemical formula 8:

[Chemical formula 8]

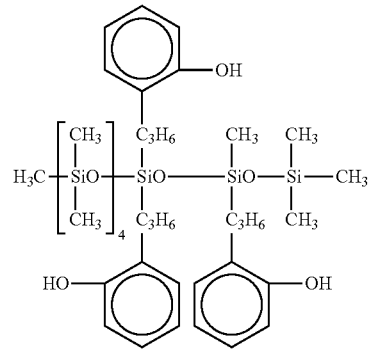

<Preparation of Polysiloxane-Polycarbonate Copolymer>

A polysiloxane-polycarbonate copolymer was prepared by the same method as described in Example 1, except that the polysiloxane of the above chemical formula 8 (in amount of 2% by weight based on the total weight of the copolymer) was used instead of the polysiloxane of the above chemical formula 7. The properties of the prepared polysiloxane-polycarbonate copolymer were measured and are shown in the following Table 1.

Example 3

A polysiloxane-polycarbonate copolymer was prepared by the same method as described in Example 1, except that the polysiloxane of the above chemical formula 7 was used in amount of 5% by weight based on the total weight of the copolymer. The properties of the prepared polysiloxane-polycarbonate copolymer were measured and are shown in the following Table 1.

Example 4

A polysiloxane-polycarbonate copolymer was prepared by the same method as described in Example 1, except that the polysiloxane of the above chemical formula 7 was used in amount of 7% by weight based on the total weight of the copolymer. The properties of the prepared polysiloxane-polycarbonate copolymer were measured and are shown in the following Table 1.

Example 5

A polysiloxane-polycarbonate copolymer was prepared by the same method as described in Example 1, except that the polysiloxane of the above chemical formula 7 was used in amount of 10% by weight based on the total weight of the copolymer. The properties of the prepared polysiloxane-polycarbonate copolymer were measured and are shown in the following Table 1.

Example 6

A polysiloxane-polycarbonate copolymer was prepared by the same method as described in Example 2, except that the polysiloxane of the above chemical formula 8 was used in amount of 7% by weight based on the total weight of the copolymer. The properties of the prepared polysiloxane-polycarbonate copolymer were measured and are shown in the following Table 1.

Example 7

A polysiloxane-polycarbonate copolymer having a viscosity average molecular weight of 70,500 was prepared by the same method as described in Example 1, using the polysiloxane of the above chemical formula 7 in amount of 5% by weight based on the total weight of the copolymer. The properties of the prepared polysiloxane-polycarbonate copolymer were measured and are shown in the following Table 1.

Comparative Example 1

The properties of a linear polycarbonate having a viscosity average molecular weight of 21,200 (TRIREX 30221R, Samyang Corporation) were measured and are shown in the following Table 1.

Comparative Example 2

A linear polycarbonate having a viscosity average molecular weight of 70,900 was prepared by the same method as described in Example 1, except that no polysiloxane was used. The properties of the prepared polycarbonate resin were measured and are shown in the following Table 1.

Comparative Example 3

A polysiloxane-polycarbonate copolymer was prepared by the same method as described in Example 1, using a hydroxyl-terminated polysiloxane of the following chemical formula 9 in amount of 5% by weight based on the total weight of the copolymer. The properties of the prepared polysiloxane-polycarbonate copolymer were measured and are shown in the following Table 1.

As shown in the above Table 1, it can be known that the polysiloxane-polycarbonate copolymers prepared in Examples 1 to 7 showed remarkably superior flame retardancy, as compared with the linear polycarbonates of Comparative Examples 1 and 2 and the polysiloxane-polycarbonate copolymer prepared by using the hydroxyl-terminated polysiloxane of chemical formula 9 in Comparative Example 3.

The methods of property measurement and evaluation used in the above Examples and Comparative Examples were as follows.

(a) H-NMR (nuclear magnetic resonance spectroscopy): This analysis was conducted by using Avance DRX 300 (Bruker). The copolymer was confirmed by H-NMR analysis wherein the peak of methyl group of dimethylsiloxane was observed at 0.2 ppm, the peak of methylene group of the joint of polysiloxane-polycarbonate was observed at 2.6 ppm, and the peak of methoxy group of the joint of polysiloxane-polycarbonate was observed at 3.9 ppm.

(b) Viscosity average molecular weight: The viscosity of methylene chloride solution was measured by using an Ubbelohde Viscometer at 20° C., and the limiting viscosity [η] therefrom was calculated according to the following equation.

$$[\eta]=1.23\times10^{-5} Mv^{0.83}$$

(c) Transmittance: The transmittance was measured by using a haze meter (HAZE-GARD PLUS, BYK GARDNER).

(d) Flame retardancy: Flame retardancy was measured according to UL-94 flame retardancy test method (UL: Underwriter's Laboratory Inc., US). The test evaluates flame retardancy from flame time or drips of flaming particles after burning on a vertically fixed specimen of a certain size for 10 seconds. Flame time is the time that the test specimen continued to flame after removal from the ignition source. Ignition of cotton layer was determined through the ignition of the cotton layer set about 300 mm under the specimen by any drips of flaming particles from the specimen. Flame retardancy ratings are shown in the the following table 2.

[Chemical formula 9]

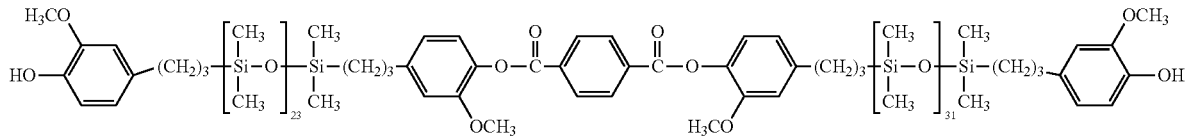

TABLE 1

| Properties | | Examples | | | | | | | Comparative Examples | | |
| --- | --- | --- | --- | --- | --- | --- | --- | --- | --- | --- | --- |
| | | 1 | 2 | 3 | 4 | 5 | 6 | 7 | 1 | 2 | 3 |
| Siloxane content (wt %) | | 2 | 2 | 5 | 7 | 10 | 7 | 5 | 0 | 0 | 5 |
| Viscosity average molecular weight (Mv) | | 21,800 | 27,100 | 22,200 | 21,500 | 22,100 | 27,800 | 70,500 | 21,200 | 70,900 | 21,100 |
| Transmittance (%) | | 90 | 90 | 89 | 87 | 87 | 88 | 89 | 90 | 90 | 87 |
| UL 94 flame retardancy | 1.5 mm | V1 | V1 | V1 | V0 | V0 | V0 | V0 | V2 | V2 | V2 |
| | 2.0 mm | V1 | V0 | V0 | V0 | V0 | V0 | V0 | V2 | V2 | V1 |
| Total flame time (sec) | 1.5 mm | 97 | 88 | 67 | 45 | 38 | 35 | 33 | 250 | 250 | 124 |
| | 2.0 mm | 57 | 45 | 43 | 35 | 27 | 25 | 22 | 250 | 71 | 65 |

TABLE 2

| Rating | V-2 | V-1 | V-0 |
|---|---|---|---|
| $1^{st}/2^{nd}$ flame time of each specimen | 30 sec or less | 30 sec or less | 10 sec or less |
| Total flame time of 5 specimens | 250 sec or less | 250 sec or less | 50 sec or less |
| Ignition of cotton layer by drips | Yes | No | No |

The invention claimed is:

1. A polysiloxane of chemical formula 1:

[Chemical formula 1]

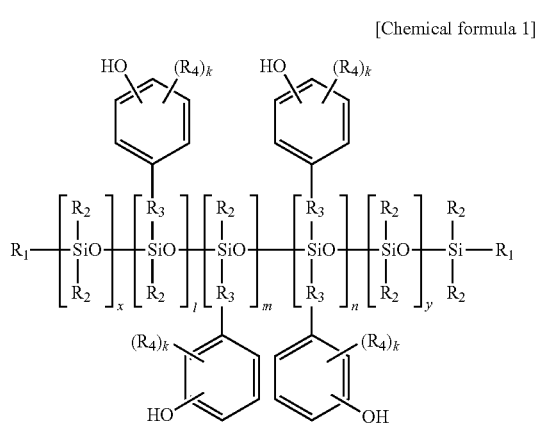

wherein, $R_1$ independently represents hydrogen atom, hydrocarbon group having 1 to 13 carbon atoms, or hydroxy group;

$R_2$ independently represents hydrocarbon group having 1 to 13 carbon atoms, or hydroxy group;

$R_3$ independently represents alkylene group having 2 to 8 carbon atoms;

$R_4$ independently represents hydrogen atom, halogen atom, hydroxy group, alkyl group having 1 to 20 carbon atoms, alkoxy group having 1 to 20 carbon atoms, or aryl group having 6 to 10 carbon atoms;

k independently represents an integer of 1 to 4;

each of l and m independently represents an integer of 0 to 4;

n represents an integer of 1 to 4; and each of x and y independently represents an integer of 0 to 100.

2. The polysiloxane of claim 1, which is a reaction product of a polysiloxane of chemical formula 3 and a compound of chemical formula 4:

[Chemical Formula 3]

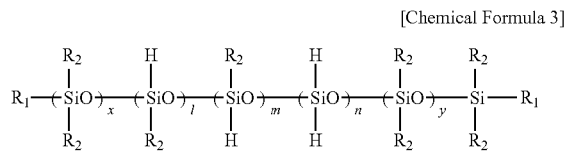

wherein $R_1$, $R_2$, l, m, n, x and y are the same as defined in chemical formula 1;

[Chemical formula 4]

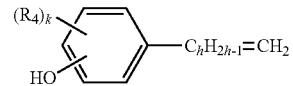

wherein $R_4$ and k are the same as defined in chemical formula 1; and h represents an integer of 1 to 7.

3. A polysiloxane-polycarbonate copolymer comprising, as repeating units, a polysiloxane of chemical formula 1 and a polycarbonate block of chemical formula 2:

[Chemical formula 1]

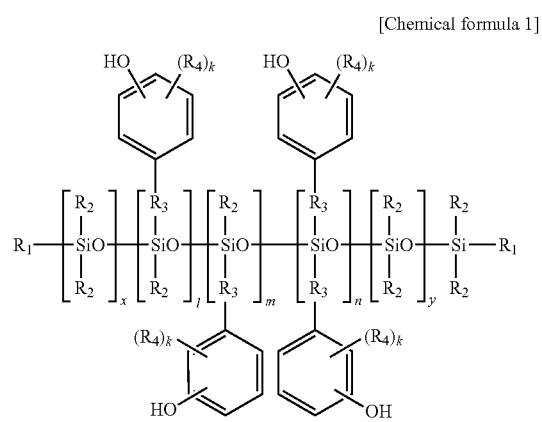

wherein, $R_1$ independently represents hydrogen atom, hydrocarbon group having 1 to 13 carbon atoms, or hydroxy group;

$R_2$ independently represents hydrocarbon group having 1 to 13 carbon atoms, or hydroxy group;

$R_3$ independently represents alkylene group having 2 to 8 carbon atoms;

$R_4$ independently represents hydrogen atom, halogen atom, hydroxy group, alkyl group having 1 to 20 carbon atoms, alkoxy group having 1 to 20 carbon atoms, or aryl group having 6 to 10 carbon atoms;

k independently represents an integer of 1 to 4;

each of l and m independently represents an integer of 0 to 4;

n represents an integer of 1 to 4; and each of x and y independently represents an integer of 0 to 100;

[Chemical formula 2]

wherein $R_5$ represents aromatic hydrocarbon group having 6 to 30 carbon atoms which is unsubstituted or substituted with alkyl group, cycloalkyl group, alkenyl group, alkoxy group, halogen atom, or nitro.

4. The polysiloxane-polycarbonate copolymer of claim 3, wherein the aromatic hydrocarbon group is derived from a compound of chemical formula 5:

[Chemical formula 5]

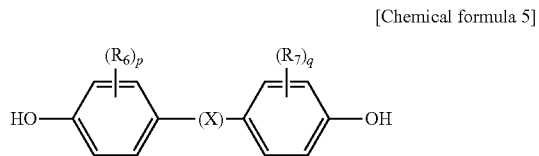

wherein,
X represents alkylene group; linear, branched or cyclic alkylene group having no functional group; or linear, branched or cyclic alkylene group comprising at least one functional group selected from the group consisting of sulfide, ether, sulfoxide, sulfone, ketone, naphthyl, or isobutylphenyl, each of $R_6$ and $R_7$ independently represents halogen atom, or linear, branched or cyclic alkyl group, and p and q independently represent an integer of 0 to 4.

5. The polysiloxane-polycarbonate copolymer of claim 3, wherein the amount of the polysiloxane of chemical formula 1 is 0.5 to 20% by weight, based on the total weight of the copolymer.

6. The polysiloxane-polycarbonate copolymer of claim 3, which has a viscosity average molecular weight of 15,000 to 200,000.

7. A method for preparing a polysiloxane-polycarbonate copolymer, comprising the steps of:
reacting a polysiloxane of chemical formula 1 and an oligomeric polycarbonate under an interfacial reaction condition to form a polysiloxane-polycarbonate intermediate; and
polymerizing the intermediate by using a first polymerization catalyst:

[Chemical formula 1]

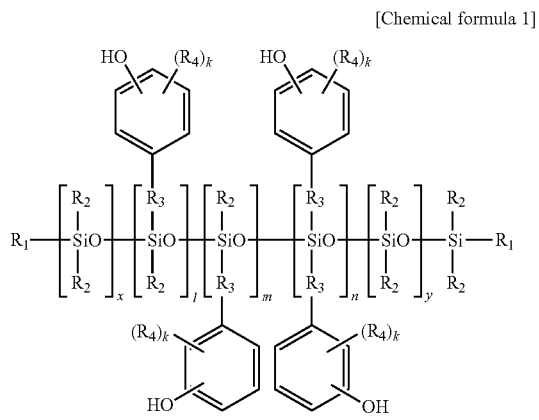

wherein,
$R_1$ independently represents hydrogen atom, hydrocarbon group having 1 to 13 carbon atoms, or hydroxy group;
$R_2$ independently represents hydrocarbon group having 1 to 13 carbon atoms, or hydroxy group;
$R_3$ independently represents alkylene group having 2 to 8 carbon atoms;
$R_4$ independently represents hydrogen atom, halogen atom, hydroxy group, alkyl group having 1 to 20 carbon atoms, alkoxy group having 1 to 20 carbon atoms, or aryl group having 6 to 10 carbon atoms;
k independently represents an integer of 1 to 4;
each of l and m independently represents an integer of 0 to 4;
n represents an integer of 1 to 4; and
each of x and y independently represents an integer of 0 to 100.

8. The method for preparing a polysiloxane-polycarbonate copolymer of claim 7, wherein the step of forming the polysiloxane-polycarbonate intermediate comprises a step of mixing a polysiloxane of chemical formula 1 and an oligomeric polycarbonate in a weight ratio of 0.5:99.5 to 20:80.

9. The method for preparing a polysiloxane-polycarbonate copolymer of claim 7, wherein the step of forming the polysiloxane-polycarbonate intermediate comprises a step of forming a mixture comprising a polysiloxane of chemical formula 1 and an oligomeric polycarbonate, wherein the mixture further comprises a phase transfer catalyst, a molecular weight-controlling agent and a second polymerization catalyst.

10. The method for preparing a polysiloxane-polycarbonate copolymer of claim 7, wherein the step of forming the polysiloxane-polycarbonate intermediate comprises a step of forming a mixture comprising a polysiloxane of chemical formula 1 and an oligomeric polycarbonate; and after completion of the reaction of the polysiloxane of chemical formula 1 and the oligomeric polycarbonate, a step of extracting an organic phase from the resulting mixture; and wherein the step of polymerizing the polysiloxane-polycarbonate intermediate comprises a step of providing the first polymerization catalyst to the extracted organic phase.

11. The method for preparing a polysiloxane-polycarbonate copolymer of claim 7, wherein the oligomeric polycarbonate has a viscosity average molecular weight of 800 to 20,000.

12. A molded article produced by using the polysiloxane-polycarbonate copolymer according to claim 3.

* * * * *

UNITED STATES PATENT AND TRADEMARK OFFICE
CERTIFICATE OF CORRECTION

PATENT NO. : 10,696,796 B2
APPLICATION NO. : 15/768099
DATED : June 30, 2020
INVENTOR(S) : Kyung Moo Shin et al.

It is certified that error appears in the above-identified patent and that said Letters Patent is hereby corrected as shown below:

On the Title Page

Item [30], insert:
-- KR 10-2015-0144192, dated October 15, 2015 --

Signed and Sealed this
Fifteenth Day of September, 2020

Andrei Iancu
*Director of the United States Patent and Trademark Office*